(12) United States Patent
Yan et al.

(10) Patent No.: US 11,403,757 B2
(45) Date of Patent: Aug. 2, 2022

(54) SIGHT LINE DETECTION METHOD AND SIGHT LINE DETECTION DEVICE (71) Applicants: Beijing BOE Optoelectronics Technology Co., Ltd., Beijing (CN); BOE Technology Group Co., Ltd., Beijing (CN)

(72) Inventors: Guixin Yan, Beijing (CN); Minglei Chu, Beijing (CN); Hao Zhang, Beijing (CN); Lili Chen, Beijing (CN); Xue Dong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 76 days.

(21) Appl. No.: 16/935,327

(22) Filed: Jul. 22, 2020

(65) Prior Publication Data
US 2021/0049760 A1 Feb. 18, 2021

(30) Foreign Application Priority Data

Aug. 15, 2019 (CN) .......................... 201910754756.8

(51) Int. Cl.
*G06V 40/18* (2022.01)
*G06T 7/00* (2017.01)
(Continued)

(52) U.S. Cl.
CPC .......... *G06T 7/0012* (2013.01); *G06V 40/171* (2022.01); *G06V 40/18* (2022.01);
(Continued)

(58) Field of Classification Search
CPC ......... G06T 7/0012; G06T 2207/30041; G06T 2207/30201; G06K 9/00281; G06K 9/00597; G06F 3/013
See application file for complete search history.

(56) References Cited

U.S. PATENT DOCUMENTS 8,295,556 B2 * 10/2012 Ohtani ............... G06K 9/00281
382/118
10,606,352 B2 * 3/2020 Chien ................ G02B 27/0179
(Continued)

FOREIGN PATENT DOCUMENTS

CN 1827035 A * 9/2006
CN 1827035 A 9/2006
(Continued)

OTHER PUBLICATIONS

Jixu Chen and Qiang Ji, "3D gaze estimation with a single camera without IR illumination," 2008 19th International Conference on Pattern Recognition, 2008, pp. 1-4, doi: 10.1109/ICPR.2008.4761343 (Year: 2008).*
(Continued)

*Primary Examiner* — Vincent Rudolph
*Assistant Examiner* — Xiaoli Zhang
(74) *Attorney, Agent, or Firm* — Westman, Champlin & Koehler, P.A.

(57) ABSTRACT

The present disclosure provides a sight line detection method, a sight line detection device, a computer readable storage medium, and a computer device. The sight line detection method comprises: receiving an image of a user taken by a camera; acquiring a plurality of face feature points according to the image of the user; calculating an eye center position and a pupil position based on the plurality of face feature points; obtaining an eye sight line based on the eye center position and obtaining a camera sight line base on the pupil position; and determining whether the eye sight
(Continued)

line coincides with the camera sight line, and in a case where the eye sight line coincides with the camera sight line, performing a sight line detection with the eye sight line coincided with the camera sight line as a reference line.

16 Claims, 7 Drawing Sheets

(51) Int. Cl.
  *G06V 40/16* (2022.01)
  *G06F 3/01* (2006.01)
(52) U.S. Cl.
  CPC .... *G06F 3/013* (2013.01); *G06T 2207/30041* (2013.01); *G06T 2207/30201* (2013.01)

(56) References Cited

U.S. PATENT DOCUMENTS

| | | | | |
|---|---|---|---|---|
| 2007/0279590 | A1* | 12/2007 | Ebisawa | A61B 3/113 351/208 |
| 2017/0123491 | A1* | 5/2017 | Hansen | H04L 12/2814 |
| 2018/0227470 | A1* | 8/2018 | Ronngren | G02B 27/0093 |
| 2019/0080474 | A1* | 3/2019 | Lagun | G06F 3/013 |
| 2019/0101979 | A1* | 4/2019 | Zhang | G02B 27/017 |
| 2019/0227622 | A1* | 7/2019 | Chien | G02B 27/017 |

FOREIGN PATENT DOCUMENTS

| | | | | | |
|---|---|---|---|---|---|
| CN | 103593044 | A | * | 2/2014 | |
| CN | 103593044 | A |   | 2/2014 | |
| CN | 106462231 | A | * | 2/2017 | ............. G06F 3/013 |
| CN | 106462231 | A |   | 2/2017 | |
| CN | 108182377 | A | * | 6/2018 | |
| CN | 108182377 | A |   | 6/2018 | |
| CN | 109240497 | A | * | 1/2019 | |
| CN | 109240497 | A |   | 1/2019 | |
| CN | 109544640 | A | * | 3/2019 | |
| CN | 109544640 | A |   | 3/2019 | |
| CN | 110069124 | A | * | 7/2019 | ............. G06F 3/013 |
| CN | 110069124 | A |   | 7/2019 | |
| JP | 201190702 | A | * | 5/2011 | |

OTHER PUBLICATIONS

Pak Il Nam, Ri Song Jin, Peter Peer, "Robust Eye Localization by Combining Classification and Regression Methods", International Scholarly Research Notices, vol. 2014, Article ID 804291, 7 pages, 2014. https://doi.org/10.1155/2014/804291 (Year: 2014).*

Kang Wang and Qiang Ji, "Real Time Eye Gaze Tracking with 3D Deformable Eye-Face Model," 2017 IEEE International Conference on Computer Vision (ICCV), 2017, pp. 1003-1011, doi: 10.1109/ICCV.2017.114 (Year: 2017).*

First Office Action, including Search Report, for Chinese Patent Application No. 201910754756.8, dated Jul. 21, 2021, 17 pages.

* cited by examiner

SIGHT LINE DETECTION METHOD AND SIGHT LINE DETECTION DEVICE

CROSS-REFERENCE TO RELATED APPLICATION(S)

This application claims priority to the Chinese Patent Application No. 201910754756.8, filed on Aug. 15, 2019, which is incorporated herein by reference in its entirety.

TECHNICAL FIELD

The present disclosure relates to the field of sight line detection technology, in particular to a sight line detection method, a sight line detection device, a computer readable storage medium, and a computer device.

BACKGROUND

A sight line detection is a technology that utilizes various detection methods such as mechanical, electronic, and optical to acquire current gaze direction of a user, which has a wide range of applications in the field of human-computer interaction, such as virtual typing, fatigue driving detection, games, education, etc. A traditional sight line detection method utilizes electromagnetic, optical or video image processing methods for detection. The sight line detection based on the video image needs to calculate correspondence between an eye and a camera, and determine a direction of the sight line by detecting movement of an eyeball, which however, will cause some errors in actual detections.

SUMMARY

An embodiment of the present disclosure provides a sight line detection method, comprising:
  receiving an image of a user taken by a camera;
  acquiring a plurality of face feature points according to the image of the user;
  calculating an eye center position and a pupil position according to the plurality of face feature points;
  obtaining an eye sight line based on the eye center position and the pupil position, and obtaining a camera sight line based on the pupil position and a position of the camera; and
  determining whether the eye sight line coincides with the camera sight line, and in a case where the eye sight line coincides with the camera sight line, performing a sight line detection by using the eye sight line coincided with the camera sight line as a reference line.

For example, acquiring a plurality of face feature points according to the image of the user comprises:
  performing a face recognition on the image of the user to obtain a face image; and
  performing a feature point detection on the face image to obtain the plurality of face feature points.

For example, calculating an eye center position and a pupil position according to the plurality of face feature points comprises:
  detecting the eye center position using a preset regression classifier according to the plurality of face feature points; and
  detecting the pupil position according to the plurality of face feature points.

For example, obtaining an eye sight line based on the eye center position and the pupil position, and obtaining a camera sight line based on the pupil position and a position of the camera comprises:
  converting two-dimensional coordinates of the eye center position and the pupil position into three-dimensional coordinates;
  calculating a first eye feature point, a second eye feature point, and a pupil feature point using a preset three-dimensional eyeball model according to the three-dimensional coordinates of the eye center position and the pupil position;
  obtaining the eye sight line based on the second eye feature point and the pupil feature point; and
  obtaining the camera sight line based on the pupil feature point and a camera center point representing the position of the camera.

For example, determining whether the eye sight line coincides with the camera sight line comprises:
  determining whether the second eye feature point, the pupil feature point and the camera center point are collinear.

For example, after converting two-dimensional coordinates of the eye center position and the pupil position into three-dimensional coordinates, and before calculating a first eye feature point, a second eye feature point, and a pupil feature point using a preset three-dimensional eyeball model according to the three-dimensional coordinates of the eye center position and the pupil position, the sight line detection method further comprises:
  calculating an attitude angle of the user's head relative to the camera according to the two-dimensional coordinates of the plurality of face feature points, the eye center position and the pupil position;
  wherein calculating a first eye feature point, a second eye feature point, and a pupil feature point using a preset three-dimensional eyeball model according to the three-dimensional coordinates of the eye center position and the pupil position comprises: calculating the first eye feature point, the second eye feature point, and the pupil feature point using the preset three-dimensional eyeball model according to the three-dimensional coordinates of the eye center position and the pupil position, and the attitude angle.

For example, performing a sight line detection by using the eye sight line coincided with the camera sight line as a reference line comprises:
  receiving an image of a user taken by a camera;
  acquiring a plurality of face feature points according to the image of the user;
  calculating an eye center position and a pupil position according to the plurality of face feature points;
  obtaining an eye sight line based on the eye center position and the pupil position; and
  determining a deviation of the eye sight line of the user from the reference line as a sight line detection result.

For example, the sight line detection method further comprises:
  displaying preset content in response to the deviation being less than or equal to a preset threshold.

For example, the preset content comprises at least one of an image or a video.

An embodiment of the present disclosure also provides a sight line detection device, comprising:
  a camera configured to take an image of a user;
  a memory having instructions stored therein; and
  a controller connected to the camera and configured to execute the instructions to:
  receive an image of a user taken by a camera;
  acquire a plurality of face feature points according to the image of the user;
  calculate an eye center position and a pupil position according to the plurality of face feature points;

obtain an eye sight line based on the eye center position and the pupil position, and obtain a camera sight line based on the pupil position and a position of the camera; and determine whether the eye sight line coincides with the camera sight line, and in a case where the eye sight line coincides with the camera sight line, performing a sight line detection by using the eye sight line coincided with the camera sight line as a reference line.

For example, the controller is further configured to:

perform a face recognition on the image of the user to obtain a face image; and perform a feature point detection on the face image to obtain the plurality of face feature points.

For example, the controller is further configured to:

detect the eye center position using a preset regression classifier according to the plurality of face feature points; and detect the pupil position according to the plurality of face feature points.

For example, the controller is further configured to:

convert two-dimensional coordinates of the eye center position and the pupil position into three-dimensional coordinates;

calculate a first eye feature point, a second eye feature point, and a pupil feature point using a preset three-dimensional eyeball model according to the three-dimensional coordinates of the eye center position and the pupil position;

obtain the eye sight line based on the second eye feature point and the pupil feature point; and obtain the camera sight line based on the pupil feature point and a camera center point representing the position of the camera.

For example, the controller is further configured to determine whether the eye sight line coincides with the camera sight line by determining whether the second eye feature point, the pupil feature point and the camera center point are collinear.

For example, the controller is further configured to: in performing a sight line detection by using the eye sight line with the camera sight line as a reference line, receive an image of a user taken by a camera;

acquire a plurality of face feature points according to the image of the user;

calculate an eye center position and a pupil position according to the plurality of face feature points;

obtain an eye sight line based on the eye center position and the pupil position; and determine a deviation of the eye sight line of the user from the reference line as a sight line detection result.

For example, the sight line detection device further comprises a display connected to the controller, wherein the controller is further configured to control the display to display preset content in response to the deviation being less than or equal to a preset threshold.

An embodiment of the present disclosure also provides a computer readable storage medium having a computer program stored thereon that, when executed by a processor, implements the sight line detection method as described above.

An embodiment of the present disclosure also provides a computer device comprising a memory and a processor, the memory storing a computer program executable by the processor, the processor is configured to implement the sight line detection method as described above when executing the computer program.

BRIEF DESCRIPTION OF THE ACCOMPANYING DRAWINGS

The specific embodiments of the present disclosure will be further described in detail below with reference to the drawings.

DETAILED DESCRIPTION

In order to explain the present disclosure more clearly, the present disclosure will be further described below with reference to preferred embodiments and drawings. Similar parts in the drawings are denoted by the same reference numbers. Those skilled in the art should understand that the content specifically described below is illustrative rather than restrictive, and should not be used to limit the protection scope of the present disclosure.

Sight line detection technology usually determines a direction of a sight line based on calculation of movement of an eyeball. If no calibration is performed between the eyeball and a camera before such process, it will easily cause errors in detection. At the same time, in the field of the sight line detection, a camera is usually used as a passive image acquisition device, that is, the camera is called to acquire an image when an image is needed, otherwise the camera is in a waiting state.

The inventor of the present application proposes to use the camera as a device for actively acquiring an image, that is, the camera actively acquires images. When the user's eyes gaze at the camera, the camera acquires relevant information such as positions of the user's eyes and a gaze direction at the first time. A state in which the user's eyes gaze at the camera at the moment in the three-dimensional space is directly defined as a standard state, and an eye sight line is further obtained according to the state and information such as geometry of the three-dimensional space.

Figure 1:
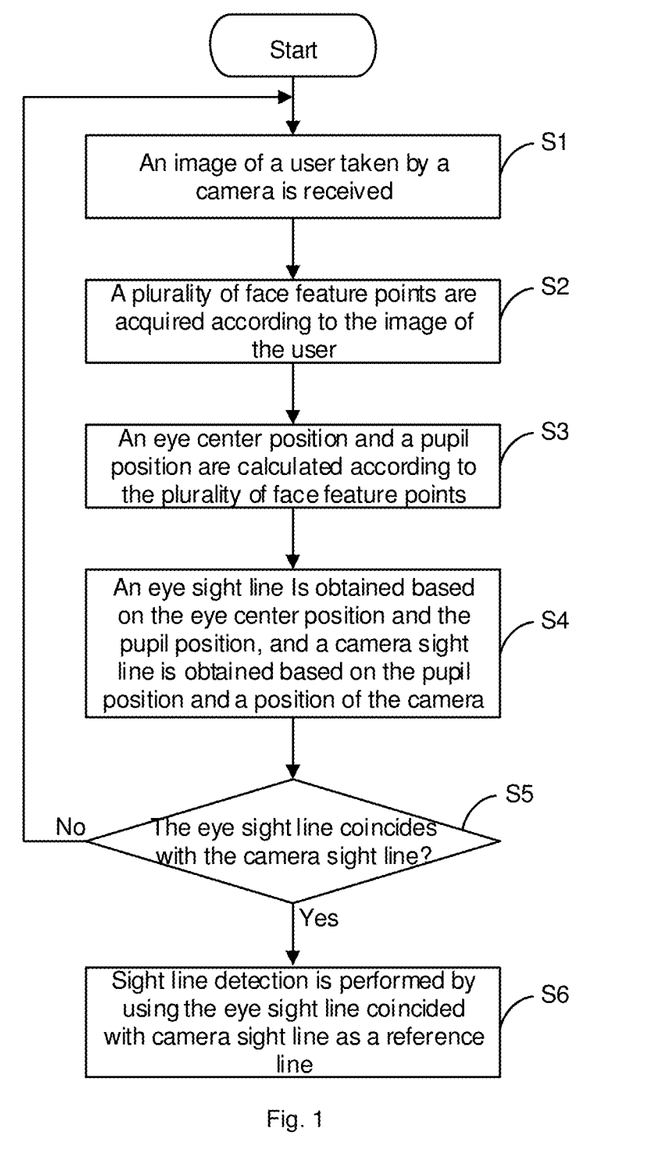
FIG. 1 illustrates a flowchart of a sight line detection method according to an embodiment of the present disclosure.

As illustrated in FIG. 1, an embodiment of the present disclosure provides a sight line detection method, comprising steps S1 to S6.

S1: An image of a user taken by a camera is received.

S2: A plurality of face feature points are acquired according to the image of the user.

S3: An eye center position and a pupil position are calculated according to the plurality of face feature points.

S4: An eye sight line is obtained based on the eye center position and the pupil position, and a camera sight line is obtained based on the pupil position and a position of the camera.

S5: Determines whether the eye sight line coincides with the camera sight line. If the eye sight line coincides with the camera sight line, step S6 is performed, otherwise it is returned to S1.

S6: Sight line detection is performed by using the eye sight line coincided with the camera sight line as a reference line.

Figure 2:
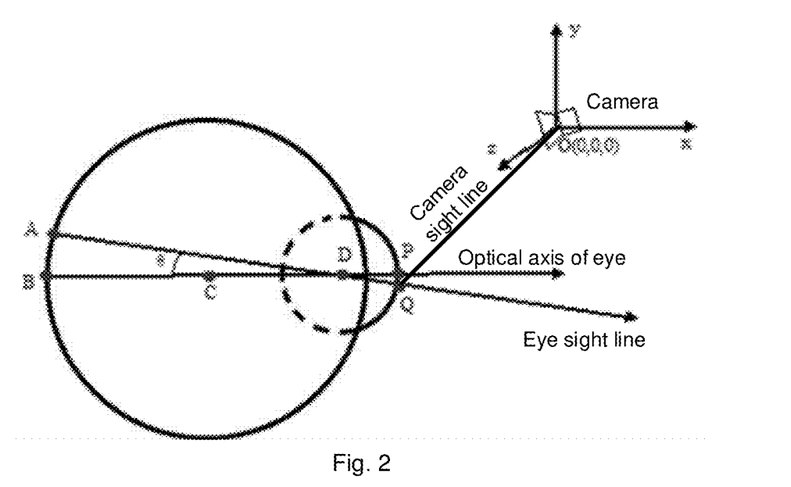
FIG. 2 illustrates a schematic diagram of a scene of the sight line detection according to an embodiment of the present disclosure.

In an example, FIG. 2 illustrates a schematic diagram of a scene of the sight line detection, which comprises a camera and the user's eyes to be detected that is simulated by a three-dimensional eyeball model.

In the embodiment, the inventor proposes to use the camera as a device for actively acquiring an image. In order to establish a camera coordinate system taking a center of the camera as an origin: first the camera is calibrated to obtain coordinates of the center of the camera, and then the coordinates are used as an origin of three-dimensional space of a camera coordinate system, denoted as point O(0, 0, 0).

On the basis of the camera coordinate system, face feature points are acquired according to pictures taken by the camera, an eye center position (hereinafter also referred to as an eye center point) and a pupil position are calculated according to the face feature points, an eye sight line and a camera sight line are acquired according to the eye center point and the pupil position, and whether the eye sight line coincides with the camera sight line is determined, to determine whether the eyes are gazing at the camera.

In some embodiments, in step S1, when it is determined that the user appears within the range of the image taken by the camera, a controller may control the camera to capture an image of the user and receive the image I(x, y).

In some embodiments, step S2 may comprise the following steps S21 and S22.

S21: Face recognition is performed on the image of user to obtain a face image. For example, if a face is recognized, step S22 is performed, and it is returned to S1 if no face is recognized.

In this embodiment, the face in the image I(x, y) is detected using the Haar feature. If no face is recognized, the image taken by the camera continues being received, and if a face is recognized, the face image $R_{face}$ is further detected.

S22: Feature point detection is performed on the face image to obtain the plurality of face feature points.

Figure 3:
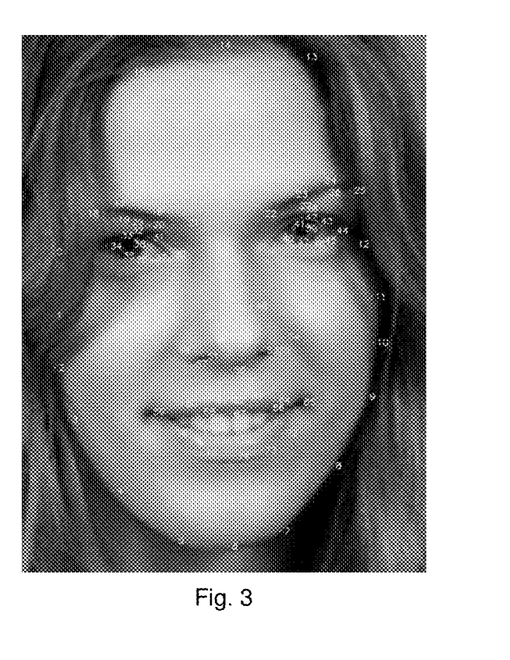
FIG. 3 illustrates a schematic diagram of face feature points according to an embodiment of the present disclosure.

In the embodiment, as illustrated in FIG. 3, 68 face feature points in $R_{face}$ are detected using the ASM face feature point detection algorithm.

Figure 4A:
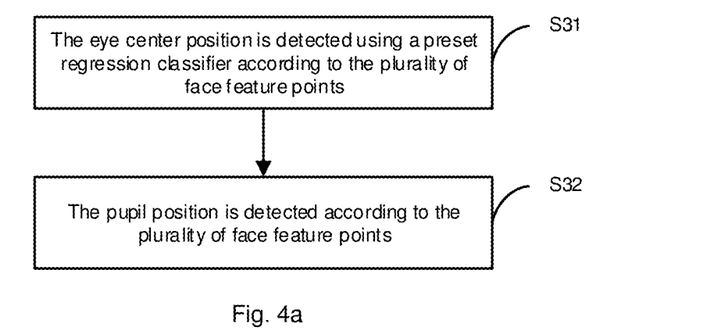
FIGS. 4a and 4b illustrate flowcharts of acquiring an eye sight line and a camera sight line according to an embodiment of the present disclosure.

In some embodiments, as illustrated in FIG. 4a, step S3 may comprise the following steps S31 to S32.

S31: Detecting the eye center position using a preset regression classifier according to the plurality of face feature points.

According to the plurality of face feature points, the numbers of the feature points located in the eyes are extracted to obtain outlines of a left eye and a right eye. It should be noted that since situations are similar in which the left eye and the right eye see the same object, a detection may be performed just on one eye. In order to improve detection accuracy, a detection may also be performed on both eyes. Those skilled in the art may perform an appropriate detection according to actual application requirements, which will not be repeated here. Illustrations are made taking the detection performed on one eye as an example, and a center of the pupil when the eye is right facing the camera is defined as the eye center point $O_{eye}$.

In consideration that different users have different eye shapes, the position of the eye center point $O_{eye}$ will also be different, the eye center point $O_{eye}$ is detected by a preset regression classifier.

In this embodiment, the regression classifier is pre-built, including specific steps as follows:

1) An eye bank is created and eye samples from multiple users are collected to obtain a sample collection of the eye bank. It should be noted that the images when the user's head and eyes are right facing the camera are collected to obtain the eye samples.

2) The ASM algorithm is used to detect eye feature points on each of the images in the eye bank, and the pupil position, that is, the position of the eye center point $O_{eye}$ is manually marked.

3) The eye feature points and the position of the eye center point $O_{eye}$ are used as features. Each face image corresponds to a set of features, and thus a feature set is obtained. The feature set is taken as an input and the eye center point $O_{eye}$ is taken as an output, and a regression classifier is obtained by training the feature set with the Adaboost algorithm.

The eye feature points among the plurality of face feature points detected from the image I(x, y) are input into the regression classifier to obtain the position of the eye center point $O_{eye}$.

S32: The pupil position is detected according to the plurality of face feature points.

In this embodiment, the image of the outline of the eye obtained above is binarized to obtain the black area of the pupil. Vertically and horizontally integral projection of the black area is performed to obtain the pupil position $O_{pupil}$, and the pupil position $O_{pupil}$ is the peak of vertically and horizontally integral projection respectively obtained.

Figure 4B:
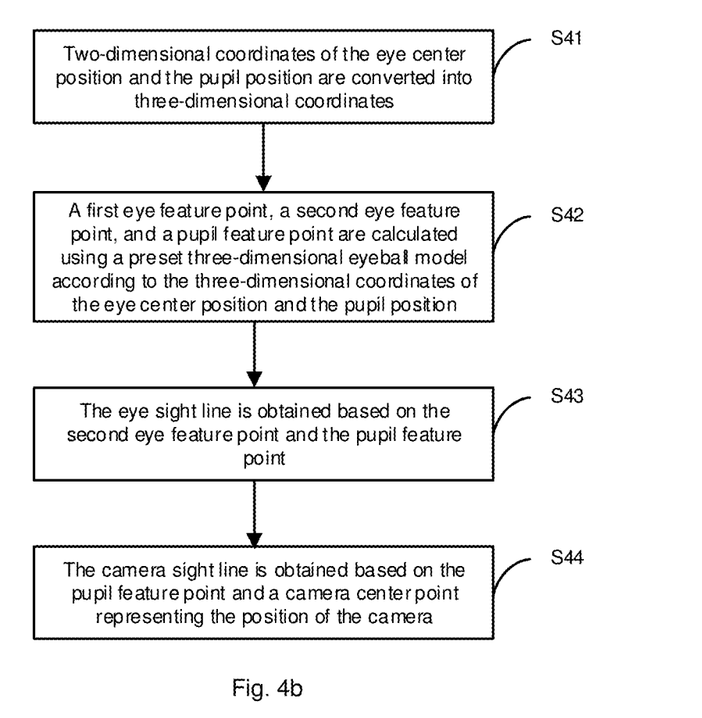

As illustrated in FIG. 4b, step S4 may comprise the following steps S41 to S44.

S41: The two-dimensional coordinates of the eye center position and the pupil position are converted into three-dimensional coordinates.

Figure 5A:
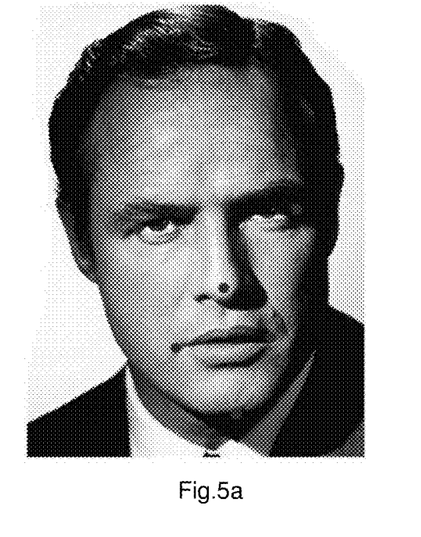
FIGS. 5a and 5b illustrate schematic diagrams of two-dimensional feature points and three-dimensional feature points according to an embodiment of the present disclosure.
Figure 5B:
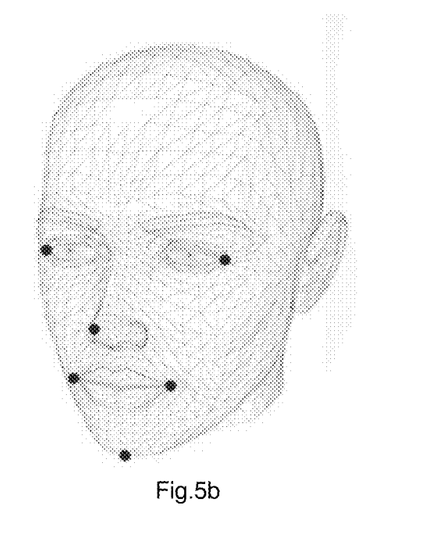

In this embodiment, the plurality of face feature points, the eye center point $O_{eye}$, and the pupil position $O_{pupil}$ are all represented by two-dimensional coordinates, and the corresponding three-dimensional coordinates of each feature point in the three-dimensional space are calculated through head posture estimation. FIG. 5a illustrates the feature points on the two-dimensional image, and the coordinates of the feature points on the two-dimensional image are converted into the three-dimensional coordinates of corresponding points in the three-dimensional space using the PnP solving algorithm as illustrated in FIG. 5b.

In consideration that influence on the position of each feature point when the head deflects, in some embodiments, an attitude angle of the user's head relative to the camera may also be calculated according to the two-dimensional coordinates of the plurality of face feature points, the eye center point and the pupil position.

Figure 6:
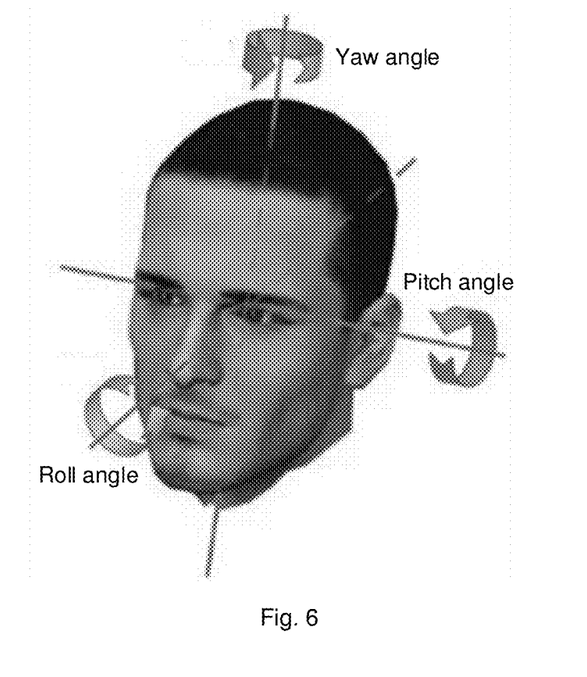
FIG. 6 illustrates a schematic diagram of an attitude angle for a head posture according to an embodiment of the present disclosure.

In this embodiment, the attitude angle including a yaw angle, a pitch angle, and a roll angle for three axes respectively, as illustrated in FIG. 6, is calculated according to the coordinates of the feature points on the two-dimensional image using the PnP solving algorithm. For example, by using the solvepnp function in a third-party open source library opencv, and taking the two-dimensional coordinates of the plurality of face feature points, the eye center point and the pupil position as inputs, the coordinates and rotation angle in the three-dimensional space corresponding to the plurality of face feature points, the eye center point and the pupil position are calculated respectively, among which the eye center point is $O_{eye}^3(x, y, z)$ and the pupil position is $O_{pupil}^3(x, y, z)$. By using the attitude angle to calculate the eye center point and the pupil position, the anti-interference ability to the rotation of the user's head may be improved.

S42: Calculating a first eye feature point (hereinafter also referred to as a first feature point), a second eye feature point (hereinafter also referred to as a second feature point), and a pupil feature point (hereinafter also referred to as a third feature point) using the preset three-dimensional eyeball model according to the three-dimensional coordinates of the eye center position and the pupil position.

In this embodiment, on the basis of acquiring the attitude angle, the first feature point, the second feature point and the third feature point may be calculated using the preset three-dimensional eyeball model according to the three-dimensional coordinates of the eye center position and the pupil position and the attitude angle.

As illustrated in FIG. 2, the three-dimensional eyeball model includes a first sphere (large circle in the figure) and a second sphere (small circle in the figure), and the first spherical center point C of the first sphere is the first feature point. Point A is the macula of the eyeball, that is, the center of the retina of the eye, and is located on the surface of the first sphere. Point B is the posterior pole of the eyeball located on the surface of the first sphere. The second sphere center point D of the second sphere is the second feature point. Point P is the pupil center located on the surface of the second sphere. The eye sight line is a first line connecting point A and point D. The third feature point Q is the intersection of the first line AD and the second sphere, that is, the exit pupil point. The optical axis of the eye is a second line connecting point B and point C. The camera sight line is a third line connecting the camera center O and the exit pupil point Q.

In this embodiment, the first line AD and the second line BC form an angle θ, and the angle θ is about 5 degrees; the diameter of the first sphere is more than 23 mm and less than 24 mm, and the diameter of the second sphere is 8 mm.

Figure 7:
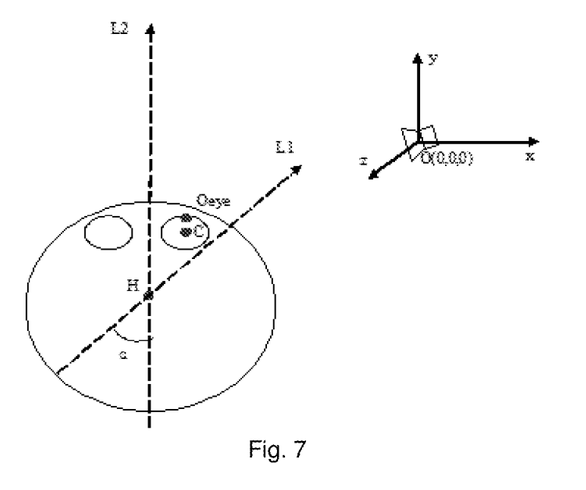
FIG. 7 illustrates a schematic diagram of the head posture according to an embodiment of the present disclosure.

On the basis of the three-dimensional eyeball model, a top view of the head is illustrated in FIG. 7, in which the large circle represents the outlines of the user's head to be detected, the two small circles represent the left eye and the right eye of the user to be detected, and point H is a center point of the head. A straight line L2 passing through point H point is defined as the positive direction of the head, and the straight line L2 is perpendicular to the connecting line between centers of the two eyes of the user to be detected. A straight line L1 passing through point H is defined as the direction the user's head is right facing the camera, which is parallel to the direction Z of the camera, and indicates the positive direction of the head posture. An angle α between L1 and L2 is the yaw angle the head around the Y-axis direction which is obtained by solving using the solve PnP function, that is, calculating corresponding attitude angle according to the two-dimensional coordinates of the plurality of face feature points, the eye center point and the pupil position. Taking the origin O of the camera as a starting point, a direction vector V1 (0, 0, −1) or any other vector that may represent this direction is selected to indicate the direction of L1. The direction vector V2 (sin α, 0, − cos α) of L2 is calculated according to the yaw angle α. Then V2 is converted into a unit vector, and the diameter of the user's eyeball to be detected is set to 24 mm, i.e. the first sphere illustrated in FIG. 2. The center of the user's eye to be detected is regarded as a point on the surface of the eyeball. Starting from the center of the eye and moving 12 mm in the direction V2 located the first feature point C, and the three-dimensional coordinates of the first feature point C are:

$$C^3(x,y,z)=O_{eye}^3(x,y,z)+12*V2.$$

Similar to the calculation of the first feature point C described above, the diameter of the second sphere as illustrated in FIG. 2 is set to 8 mm, and the coordinates of point D are calculated according to the three-dimensional coordinates of the pupil position $O_{pupil}^3(x, y, z)$:

$$D^3(x,y,z)=O_{pupil}^3(x,y,z)+4*V2.$$

As illustrated in FIG. 2, the vector $V_{CD}$ of direction CD connecting point C and point D is calculated. The direction vector of DQ may be calculated according to the angle θ and unitized into $V_{DQ}$, so that the coordinates of point Q is calculated as:

$$Q^3(x,y,z)=D^3(x,y,z)+4*V_{DQ}.$$

S43: The eye sight line is obtained based on the second eye feature point and the pupil feature point.

S44: The camera sight line is obtained based on the pupil feature point and a camera center point representing the position of the camera.

In some embodiments, the eye sight line AD and the camera sight line OQ may be obtained according to the second feature point D, the third feature point Q, and the camera center point O.

In some embodiments, in step S5, whether the eye sight line coincides with the camera sight line may be determined by determining whether the second feature point D, the third feature point Q and the camera center point O are collinear.

In this embodiment, as illustrated in FIG. 2, whether the eye sight line coincides with the camera sight line is determined. Since the third feature point Q is in the direction of the eye sight line, determining whether the eye sight line coincides with the camera sight line may be specifically converted into determining whether the second feature point D, the third feature point Q and the camera center point O are collinear. If the second feature point D, the third feature point Q and the camera center point O are collinear, it indicates that the user's eyes be detected are gazing at the camera. The eye sight line and the camera sight line are taken as a reference line, and subsequent sight line detection may be performed with respect to the reference line.

When determining whether the eye sight line coincides with the camera sight line, the direction of the sight line may be considered. For example, the direction from the second feature point D to the third feature point Q is taken as the direction of the eye sight line, and the direction from the third feature point Q to the camera center point O is taken as the direction of the camera sight line. When the second feature point D, the third feature point Q, and the camera center point O are collinear, it may be further determined that whether the direction of the eye sight line is opposite to the direction of the camera sight line, and if so, it is determined that the eye sight line coincides with the camera sight line. In this way, wrong determination that the user's eyes are gazing at the camera when the user's eyes are facing away from the camera may be avoided.

In this embodiment, whether the user's eyes are gazing at the camera is determined by defining the camera sight line and the eye sight line, so that the subsequent sight line detection is performed by using the eye sight line at the time when the user's eyes gazing at the camera as the reference line. That is, a calibration of the eye and the camera is completed when the user's eyes are gazing at the camera, and the detection and tracking of the eye sight line is further realized by using the eye sight line and the camera sight line as the reference line. Therefore, the detection of the eye sight line may be realized at any time according to the reference line, the sight line drift of the sight line estimation is relieved, and the position of the camera is not required to be calibrated in advance, and an accurate sight line detection may be performed by using a common camera, which has a broad application prospect.

In an embodiment of the present application, after the reference line is determined, the sight line detection may be performed with respect to the reference line. For example, the eye sight line of the user and the camera sight line of the camera are determined as the reference line through the sight line detection method as described above. By using the reference line, a preset image and/or video may be played by a display device (for example, a display) in response to input control signals.

Figure 8:
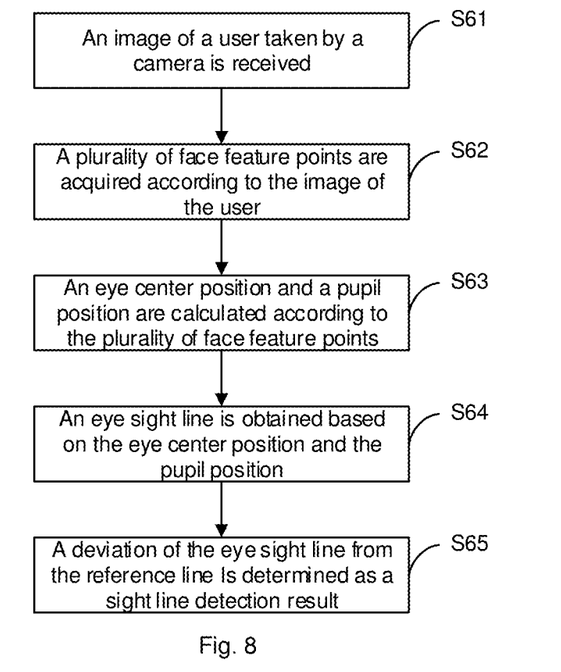
FIG. 8 illustrates a flowchart of performing sight line detection by using a reference line according to an embodiment of the present disclosure.

As illustrated in FIG. 8, step S6 may comprise the following steps S61 to S65.

S61: An image of a user taken by a camera is received.

S62: A plurality of face feature points are acquired according to the image of the user.

S63: An eye center position and a pupil position are calculated according to the plurality of face feature points.

S64: An eye sight line is obtained based on the eye center position and the pupil position.

S65: A deviation of the eye sight line of the user from the reference line is determined as a sight line detection result.

For example, if the deviation in the sight line detection result is less than or equal to a preset threshold, it may be considered that the eye is gazing at the camera, and at this time, preset content may be displayed to the user. The preset content includes but not limited to at least one of an image or a video. The preset threshold may be set as desired, for example, it may be 0 degrees, 1 degree, 2 degrees, etc.

In an example, an advertisement column installed in the subway has a display device. A camera is provided on the advertisement column. The camera may be provided in the display device or may be externally connected to the display device to capture the user's gaze at the display device. According to the sight line detection method described above, when there is a user in the image taken by the camera and the user is gazing at the camera, it is considered that the calibration of the user's eyes and the camera (that is, the reference line is determined) is completed. After the display device receives a calibration control signal, it plays images or videos prestored in the display device. In other words, whether the user is gazing at the display device is detected, and when it is determined that the user is gazing at the display device, the display device displays pre-stored images such as a picture advertisement, or displays pre-stored videos such as a video advertisement. In this way, the advertisement may be played according to the user's gaze point, thereby improving actual efficiency of an advertisement play, reducing cost of the advertisement, and improving play efficiency of the advertisement.

An embodiment of the present application further provides a sight line detection device, which may perform the sight line detection method provided in any of the embodiments described above.

Figure 9:
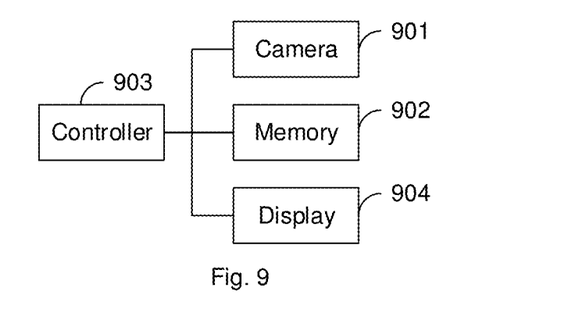
FIG. 9 illustrates a structural block diagram of a sight line detection device according to an embodiment of the present disclosure.

As illustrated in FIG. 9, an embodiment of the present application further provides a sight line detection device, comprising a camera 901, a memory 902, and a controller 903. The camera 901 and the memory 902 are connected to the controller 903. The camera 901 may capture an image of a user. The memory 902 stores instructions. The controller 903 may execute the instructions stored in the memory 902, thereby performing the sight line detection method in any of the embodiments described above.

For example, the controller 903 may receive an image of the user taken by the camera 901, obtain a plurality of face feature points according to the image, and calculate an eye center point and a pupil position according to the plurality of face feature points, thereby obtaining an eye sight line and a camera sight line of the camera 901, determine whether the eye sight line coincides with the camera sight line, and perform the sight line detection by using the eye sight line coincided with the camera sight line as a reference line if it coincides.

In some embodiments, in performing the sight line detection by using the eye sight line coincided with the camera sight line as a reference line, the controller 903 may receive an image of the user taken by the camera, acquire a plurality of face feature points according to the image of the user, calculate an eye center position and a pupil position according to the plurality of face feature points, obtain an eye sight line based on the eye center position and the pupil position, and determine a deviation of the eye sight line of the user from the reference line as a sight line detection result.

In some embodiments, the sight line detection device may further include a display 904 connected to the controller 903. The controller 903 may further control the display 904 to display preset content in response to the deviation in the result of the sight line detection being less than or equal to a preset threshold.

In some embodiments, the controller comprises a sight line calculation unit and a determination unit. The sight line calculation unit comprises a face recognition unit, a feature point detection unit, a detection unit, a coordinate conversion unit, and a calculation unit. The face recognition unit is configured to perform face recognition on the image. The feature point detection unit is configured to perform a feature point detection on the image to obtain a plurality of face feature points. The detection unit is configured to detect an eye center point using a preset regression classifier according to the plurality of face feature points, and detect the pupil position according to the plurality of face feature points. The coordinate conversion unit is configured to convert two-dimensional coordinates of the plurality of face feature points, the eye center point and the pupil position into three-dimensional coordinates. The calculation unit is configured to calculate a first feature point, a second feature point, and a third feature point and obtain the eye sight line and the camera sight line using a preset three-dimensional eyeball model according to the three-dimensional coordinates of the plurality of face feature points, the eye center point and the pupil position. The determination unit is configured to determine whether the eye sight line coincides with the camera sight line, and if yes, the eye sight line and the camera sight line are used as a reference.

An embodiment of the present disclosure provides a computer readable storage medium having a computer program stored thereon that, when executed by a processor implements the sight line detection method of any of the embodiments described above. For example, in step S1: receiving an image of a user taken by a camera. In step S2: acquiring a plurality of face feature points according to the image. In step S3: calculating an eye center point and a pupil position according to the plurality of face feature points. In step S4: obtaining an eye sight line and a camera sight line. In step S5: determining whether the eye sight line coincides with the camera sight line, and if it coincides, step S6 is performed, otherwise it is returned to S1. In step S6: performing a sight line detection by using the eye sight line coincided with the camera sight line as a reference line.

Another embodiment of the present disclosure provides a computer-readable storage medium having a computer program stored thereon that, when executed by a processor implements the sight line detection method of any of the embodiments described above. For example, the sight line detection method is used to calibrate an eye sight line of a user and a camera sight of a camera, and a display device plays a preset image and/or video in response to an input calibration control signal.

In practical applications, the computer readable storage medium may be any combination of one or more computer readable medium. The computer readable medium may be a computer readable signal medium or a computer readable storage medium. The computer readable storage medium may be, for example but not limited to, an electrical, magnetic, optical, electromagnetic, infrared, or semiconductor system, apparatus or device, or any combination of the above. More specific examples (non-exhaustive lists) of computer readable storage medium include: electrical connections with one or more wires, portable computer diskettes, hard disks, random access memory (RAM), read-only memory (ROM), Erasable programmable read-only memory (EPROM or flash), optical fiber, portable compact disk read-only memory (CD-ROM), optical storage device, magnetic storage device, or any suitable combination of the above. In this embodiment, the computer readable storage medium may be any tangible medium that contains or stores a program, which may be used by or in combination with an instruction execution system, apparatus, or device.

The program code contained on the computer readable medium may be transmitted using any appropriate medium, including but not limited to wireless, wire, optical cable, RF, etc., or any suitable combination of the above.

The computer program code for performing the operations of the present disclosure may be written in one or more programming languages or a combination thereof, the programming languages including object-oriented programming languages such as Java, Smalltalk, C++, as well as conventional procedural programming language such as "C" language or similar programming language. The program code may be executed entirely on the user's computer, partly on the user's computer, as an independent software package, partly on the user's computer and partly on a remote computer, or entirely on the remote computer or a server. In situations involving remote computers, the remote computer may be connected to the user's computer through any kind of networks, including a local area network (LAN) or a wide area network (WAN), or the remote computer may be connected to an external computer (for example, through an Internet connection using an Internet service provider).

Figure 10:
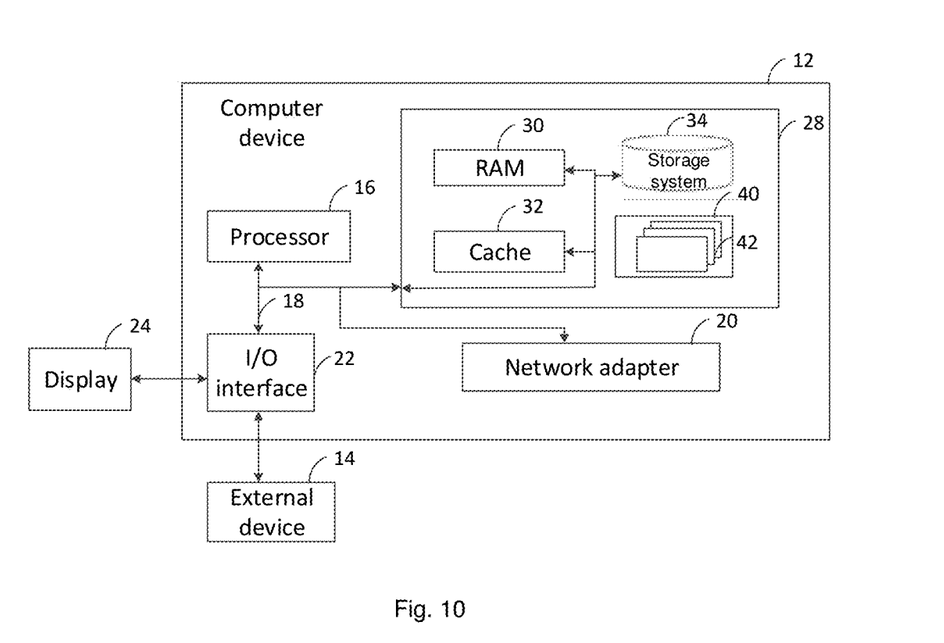
FIG. 10 illustrates a schematic structural diagram of a computer device according to an embodiment of the present disclosure.

As illustrated in FIG. 10, a schematic structural diagram of a computer device provided by another embodiment of the present disclosure is illustrated. The computer device 12 illustrated in FIG. 10 is merely an example, and should not bring any limitation to functions and use scopes of the embodiments of the present disclosure.

As illustrated in FIG. 10, the computer device 12 is embodied in the form of a general purpose computing device. Components of the computer device 12 may include, but not limited to, one or more processors or processing units 16, a system memory 28, and a bus 18 connecting different system components (including the system memory 28 and the processing unit 16).

The bus 18 represents one or more of several types of bus structures, including a memory bus or a memory controller, a peripheral bus, a graphics acceleration port, a processor, or a local bus using any of a variety of bus structures. For example, these architectures include, but not limited to, industry standard architecture (ISA) bus, micro channel architecture (MAC) bus, enhanced ISA bus, Video Electronics Standards Association (VESA) local bus, and peripheral component interconnection (PCI) bus.

The computer device 12 typically includes a variety of computer system readable medium. These medium may be any available medium that may be accessed by the computer device 12, including volatile and non-volatile medium, removable and non-removable medium.

The system memory 28 may include computer system readable medium in the form of volatile memory, such as random access memory (RAM) 30 and/or cache memory 32. The computer device 12 may further include other removable/non-removable, volatile/non-volatile computer system storage medium. Merely by way of example, the storage system 34 may be used to read and write non-removable, non-volatile magnetic medium (not illustrated in FIG. 10, commonly referred to as a "hard drive"). Although it is not illustrated in FIG. 10, a magnetic disk drive for reading and writing to a removable non-volatile magnetic disk (for example, "floppy disk"), and an optical disk drive for reading and writing to a removable non-volatile optical disk (for example, CD-ROM, DVD-ROM or other optical medium) may be provided. In such cases, each drive may be connected to the bus 18 through one or more data medium interfaces. The memory 28 may include at least one program product having a set (eg, at least one) of program modules that are configured to perform the functions of various embodiments of the present disclosure.

A program/utility tool 40 having a set of (at least one) program module 42 may be stored in, for example, the memory 28. Such program module 42 include but not limited to an operating system, one or more applications, other program modules, and program data. Each of or some combination of these examples may include implementation of a network environment. The program module 42 generally performs the functions and/or methods in the embodiments described in the present disclosure.

The computer device 12 may further communicate with one or more external devices 14 (for example, a keyboard, a pointing device, the display 24, etc.), and may also communicate with one or more devices that enable a user to interact with the computer device 12, and/or with any devices that enable the computer device 12 to communicate with one or more other computing devices (for example, a network card, a modem, etc.). This communication may be performed through an input/output (I/O) interface 22. Moreover, the computer device 12 may also communicate with one or more networks (for example, a local area network (LAN), a wide area network (WAN) and/or a public network, such as the Internet) through a network adapter 20. As illustrated in FIG. 10, the network adapter 20 communicates with other modules of the computer device 12 via the bus 18. It should be understood that although not illustrated in FIG. 10, other hardware and/or software modules may be used in conjunction with the computer device 12, including but not limited to: microcode, a device driver, a redundant processing unit, an external disk drive array, a RAID system, a tape drive and a data backup storage system, etc.

The processing unit 16 implements various functional applications and data processing, for example, to implement a sight line detection method provided by an embodiment of the present disclosure, by executing a program stored in the system memory 28.

The present disclosure discloses a sight line detection method, a sight line detection device, a computer readable storage medium, and a computer device. The sight line detection method determines whether the user's eyes are gazing at the camera according to defined camera sight line and eye sight line, thereby determining a standard state when the user's eyes are gazing at the camera. According to the standard state, the eye sight line and the camera sight line may be detected at any time, the sight line drift of the sight line estimation is relieved, and the eye sight line may be accurately detected without calibrating the camera, which has a broad application prospect.

The embodiments of the present disclosure described above are merely examples for clearly explaining the present disclosure, rather than limiting the embodiments of the present disclosure. For those ordinary skilled in the art, on the basis of above description, other different forms of changes or changes may also be made. It is not possible to exhaustively list all embodiments, any changes or modifications derived from the technical solutions of the present disclosure are still within the protection scope of the present disclosure.

We claim:

1. A sight line detection method, comprising:
receiving an image of a user taken by a camera;
acquiring a plurality of face feature points according to the image of the user;
calculating an eye center position and a pupil position according to the plurality of face feature points;
obtaining an eye sight line based on the eye center position and the pupil position, and obtaining a camera sight line based on the pupil position and a position of the camera; and
determining whether the eye sight line coincides with the camera sight line, and in a case where the eye sight line coincides with the camera sight line, performing a sight line detection by using the eye sight line coincided with the camera sight line as a reference line,
wherein obtaining an eye sight line based on the eye center position and the pupil position, and obtaining a camera sight line based on the pupil position and a position of the camera comprises:
converting two-dimensional coordinates of the eye center position and the pupil position into three-dimensional coordinates;
calculating a first eye feature point, a second eye feature point, and a pupil feature point using a present three-dimensional eyeball model according to the three-dimensional coordinates of the eye center position and the pupil position;
obtaining the eye sight line based on the second eye feature point and the pupil feature point; and
obtaining the camera sight line based on the pupil feature point and a camera center point representing the position of the camera,
wherein the three-dimensional eyeball model includes a first sphere and a second sphere, the first eye feature point (C) is a first spherical center point of the first sphere, a center (A) of a retina of the eye is located on the surface of the first sphere, a posterior pole (B) of the eye is located on the surface of the first sphere, the second eye feature point (D) is a second sphere center point of the second sphere, the eye sight line is a first line connecting the center (A) of the retina of the eye and the second sphere center point (D), the pupil feature point (O) is an exit pupil point which is an intersection of the first line and the second sphere, a pupil center (P) is located on the surface of the second sphere, an optical axis of the eye is a second line connecting the posterior pole (B) of the eye and the first spherical center point (C), and the camera sight line is a third line connecting the camera center point (O) and the pupil feature point (O), and
wherein determining whether the eye sight line coincides with the camera sight line comprises determining whether the second eye feature point, the pupil feature point and the camera center point are collinear.

2. The sight line detection method according to claim 1, wherein acquiring a plurality of face feature points according to the image of the user comprises:
performing a face recognition on the image of the user to obtain a face image; and
performing a feature point detection on the face image to obtain the plurality of face feature points.

3. The sight line detection method according to claim 2, wherein calculating an eye center position and a pupil position according to the plurality of face feature points comprises:
detecting the eye center position using a preset egression classifier according to the plurality of face feature points; and
detecting the pupil position according to the plurality of face feature points.

4. The sight line detection method according to claim 1, wherein after converting two-dimensional coordinates of the eye center position and the pupil position into three-dimensional coordinates, and before calculating a first eye feature point, a second eye feature point, and a pupil feature point using a preset three-dimensional eyeball model according to the three-dimensional coordinates of the eye center position and the pupil position, the sight line detection method further comprises:
calculating an attitude angle of the user's head relative to the camera according to the two-dimensional coordinates of the plurality of face feature points, the eye center position and the pupil position;
wherein calculating a first eye feature point, a second eye feature point, and a pupil feature point using a preset three-dimensional eyeball model according to the three-dimensional coordinates of the eye center position and the pupil position comprises: calculating the first eye feature point, the second eye feature point, and the pupil feature point using the preset three-dimensional eyeball model according to the three-dimensional coordinates of the eye center position and the pupil position, and the attitude angle.

5. The sight line detection method according to claim 1, wherein performing a sight line detection by using the eye sight line coincided with the camera sight line as a reference line comprises:
receiving an image of a user taken by a camera;
acquiring a plurality of face feature points according to the image of the user;
calculating an eye center position and a pupil position according to the plurality of face feature points;
obtaining an eye sight line based on the eye center position and the pupil position; and determining a deviation of the eye sight line of the user from the reference line as a sight line detection result.

6. The sight line detection method according to claim 5, further comprising:
displaying preset content in response to the deviation being less than or equal to a preset threshold.

7. The sight line detection method according to claim 6, wherein the preset content comprises at least one of an image or a video.

8. A non-transitory computer readable storage medium having a computer program stored thereon that, when executed by a processor, implements the sight line detection method of claim 6.

9. A computer device comprising a memory and a processor, the memory storing a computer program executable by the processor, the processor is configured to implement the sight line detection method of claim 6 when executing the computer program.

10. A non-transitory computer readable storage medium having a computer program stored thereon that, when executed by a processor, implements the sight line detection method of claim 1.

11. A computer device comprising a memory and a processor, the memory storing a computer program executable by the processor, the processor is configured to implement the sight line detection method of claim 1 when executing the computer program.

12. A sight line detection device, comprising:
a camera configured to take an image of a user;
a memory having instructions stored therein; and
a controller connected to the camera and configured to execute the instructions to:
receive an image of a user taken by a camera;
acquire a plurality of face feature points according to the image of the user;
calculate an eye center position and a pupil position according to the plurality of face feature points;
obtain an eye sight line based on the eye center position and the pupil position, and obtain a camera sight line based on the pupil position and a position of the camera; and
determine whether the eye sight line coincides with the camera sight line, and in a case where the eye sight line coincides with the camera sight line, performing a sight line detection by using the eye sight line coincided with the camera sight line as a reference line,
wherein the controller is further configured to:
convert two-dimensional coordinates of the eye center position and the pupil position into three-dimensional coordinates;
calculate a first eye feature point, a second eye feature point, and a pupil feature point using a preset three-dimensional eyeball model according to the three-dimensional coordinates of the eye center position and the pupil position;
obtain the eye sight line based on the second eye feature point and the pupil feature point; and
obtain the camera sight line based on the pupil feature point and a camera center point representing the position of the camera,
wherein the three-dimensional eyeball model includes a first sphere and a second sphere, the first eye feature point (C) is a first spherical center point of the first sphere, a center (A) of a retina of the eye is located on the surface of the first sphere, a posterior pole (B) of the eye is located on the surface of the first sphere, the second eye feature point (D) is a second sphere center point of the second sphere, the eye sight line is a first line connecting the center (A) of the retina of the eye and the second sphere center point (D), the pupil feature point (O) is an exit pupil point which is an intersection of the first line and the second sphere, a pupil center (P) is located on the surface of the second sphere, an optical axis of the eye is a second line connecting the posterior pole (B) of the eye and the first spherical center point (C), and the camera sight line is a third line connecting the camera center point (O) and the pupil feature point (O), and
wherein the controller is further configured to determine whether the eye sight line coincides with the camera sight line by determining whether the second eye feature point, the pupil feature point and the camera center point are collinear.

13. The sight line detection device according to claim 12, wherein the controller is further configured to:
perform a face recognition on the image of the user to obtain a face image; and
perform a feature point detection on the face image to obtain the plurality of face feature points.

14. The sight line detection device according to claim 12, wherein the controller is further configured to:
detect the eye center position using a preset regression classifier according to the plurality of face feature points; and
detect the pupil position according to the plurality of face feature points.

15. The sight line detection device according to claim 12, wherein the controller is further configured to: in performing a sight line detection by using the eye sight line coincided with the camera sight line as a reference line,
receive an image of a user taken by a camera;
acquire a plurality of face feature points according to the image of the user;
calculate an eye center position and a pupil position according to the plurality of face feature points;
obtain an eye sight line based on the eye center position and the pupil position; and
determine a deviation of the eye sight line of the user from the reference line as a sight line detection result.

16. The sight line detection device according to claim 15, further comprising a display connected to the controller, wherein the controller is further configured to control the display to display preset content in response to the deviation being less than or equal to a preset threshold.

* * * * *